United States Patent
Singh

(10) Patent No.: US 12,493,418 B2
(45) Date of Patent: *Dec. 9, 2025

(54) METHOD AND SYSTEM FOR MANAGING DATA IN A COMPUTER SYSTEM

(71) Applicant: PointsBet Pty Ltd., Cremorne (AU)

(72) Inventor: Manjit Gombra Singh, Saratoga, CA (US)

(73) Assignee: PointsBet Pty Ltd., Cremorne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,260

(22) Filed: Jan. 29, 2024

(65) Prior Publication Data

US 2024/0168657 A1 May 23, 2024

Related U.S. Application Data

(63) Continuation of application No. 17/577,312, filed on Jan. 17, 2022, now Pat. No. 11,928,340, which is a continuation of application No. 16/927,637, filed on Jul. 13, 2020, now Pat. No. 11,226,749.

(51) Int. Cl.
*G06F 3/06* (2006.01)
*G06F 21/62* (2013.01)

(52) U.S. Cl.
CPC .......... *G06F 3/0622* (2013.01); *G06F 3/0637* (2013.01); *G06F 3/0676* (2013.01); *G06F 21/6245* (2013.01); *G06F 2221/2111* (2013.01); *G06F 2221/2129* (2013.01)

(58) Field of Classification Search
None
See application file for complete search history.

(56) References Cited

U.S. PATENT DOCUMENTS

| | | | |
|---|---|---|---|
| 9,426,221 B2 | 8/2016 | Fleming | |
| 9,774,656 B1 | 9/2017 | Jackson | |
| 11,226,749 B1 | 1/2022 | Singh | |
| 11,895,232 B1 * | 2/2024 | Stapleton | H04L 9/0861 |
| 11,928,340 B2 | 3/2024 | Singh | |
| 2005/0181870 A1 * | 8/2005 | Nguyen | G07F 17/32 463/29 |

(Continued)

OTHER PUBLICATIONS

United States Patent and Trademark Office, "Notice of Allowance and Fee(s) Due," issued in connection with U.S. Appl. No. 16/927,637, dated Dec. 2, 2021, 8 pages.

(Continued)

*Primary Examiner* — Edward J Dudek, Jr.
*Assistant Examiner* — Ralph A Verderamo, III
(74) *Attorney, Agent, or Firm* — Hanley, Flight & Zimmerman, LLC

(57) ABSTRACT

Apparatus and methods for managing data in a computer system are disclosed. An example apparatus is to at least: determine a geographic location of a computing device associated with a user, the computing device remote from a data storage device, the data storage device including main data, first subsidiary data, and second subsidiary data associated with the user; change from the main data to a selected one of the first subsidiary data or the second subsidiary data based on the geographic location; and modify the selected one of the first subsidiary data or the second subsidiary data via the computing device.

20 Claims, 9 Drawing Sheets

(56) References Cited

U.S. PATENT DOCUMENTS

| | | |
|---|---|---|
| 2011/0034252 A1 | 2/2011 | Morrison |
| 2016/0180093 A1 | 6/2016 | Goss |
| 2017/0186272 A1 | 6/2017 | Schwartz |
| 2018/0169507 A1* | 6/2018 | Snow .................. G07F 17/3293 |
| 2021/0004807 A1* | 1/2021 | Joao .................... G06Q 20/4015 |
| 2021/0216507 A1* | 7/2021 | Nie .......................... G06F 3/067 |
| 2021/0297399 A1 | 9/2021 | Brannon |
| 2022/0011947 A1 | 1/2022 | Singh |

OTHER PUBLICATIONS

United States Patent and Trademark Office, "Non-Final Office Action," issued in connection with U.S. Appl. No. 17/577,312, dated May 25, 2023, 14 pages.

United States Patent and Trademark Office, "Notice of Allowance and Fee(s) Due," issued in connection with U.S. Appl. No. 17/577,312, dated Oct. 2, 2023, 5 pages.

\* cited by examiner

500

Customer 1 State A Sub-Account

- Name (last, first, middle initial)
- ID/Username
- Password
- Date of State A Sub-Account creation
- Casino Partner(s) associated with account in State A
- Registered address(es) in State A
- Registered email address(es)
- Registered telephone number(s)
- ID verification information
  - Is ID verified (Y/N)?
- Date of Birth
- Age verification information
  - Is Age verified (Y/N)?
- Geo-location at time of State A Sub-Account opening
  - Location (physical, IP)
  - Results of location verification check
- Registered bank account(s)/funding sources
- Financial information
  - Initial Deposit in State A
    - Account used
    - Amount
  - Open to Buy/Open to Play amount in State A
    - Initially equal to initial deposit in State A + any "free play" incentives in State A
  - Deposit/withdrawal history in State A
    - Initially just the Initial Deposit in State A
  - Wagering history in State A
    - At time of State A Sub-Account creation, none
- Transaction history within State A

Figure 5

| Timestamp | Username | Balance Before | Balance After | Amount | Description |
|---|---|---|---|---|---|
| 2019-12-30 10:00:00 | Customer 1 | $0 | $100 | +$100 | Account Opening |
| 2019-12-30 10:05:00 | Customer 1 | $100 | $90 | -$10 | Wager placed in State A |
| 2019-12-30 13:30:00 | Customer 1 | $90 | $110 | +$20 | Wager won in State A |
| 2019-12-30 13:45:00 | Customer 1 | $110 | $100 | -$10 | Wager placed in State A |
| 2019-12-30 14:30:00 | Customer 1 | $100 | $120 | +$20 | Wager won in State A |
| 2019-12-30 14:40:00 | Customer 1 | $120 | $110 | -$10 | Wager placed in State A |

FIGURE 7

METHOD AND SYSTEM FOR MANAGING DATA IN A COMPUTER SYSTEM

RELATED APPLICATIONS

This patent is a continuation of U.S. patent application Ser. No. 17/577,312, which was filed Jan. 17, 2022, and titled "Method And System For Managing Data In A Computer System", which claims priority as a continuation of U.S. patent application Ser. No. 16/927,637 (now U.S. Pat. No. 11,226,749), which was filed Jul. 13, 2020 and titled "Method And System For Managing Data In A Computer System", each of which is hereby incorporated by reference in its entirety.

FIELD

This specification relates generally to the field of managing data in computer systems and has particular, but by no means exclusive, application to controlling access to data contained in a data storage device (e.g., a hard disk) that requires a level of control placed around how and when that data is accessed by elements or computational processes within computer systems.

BACKGROUND

Managing and controlling access to electronic data is an essential core function performed by computer systems. Many of today's software applications rely on efficient and effective data management in order to provide their required functionality. Management of data is commonly performed by many different components (including software and hardware) of a computer system; for example, operating systems provide a certain type of data management, databases applications also provide other types of data management functions that are not offered my operating systems. Data management is not just restricted to software components (e.g., operating systems and applications) but is also the domain of hardware within a computer system such as Error Correcting Code (ECC) memory chips, which provide a low level form of detecting and correcting errors in data stored in the memory chips. While some forms of data management (e.g., error detection and correction) are common to many computer system process and can be implemented within common low level components of the computer systems such as in memory chips or at the operating system level. However, in some situation the required data management methodologies are specific to particular functions and are therefore implemented at the higher application software level. One such example is the ability to efficient and quickly search through large amounts of data so it is common to find these data searching and locations technologies implemented within database applications.

Data management is a highly complex field of technology and accordingly a great deal of research that is undertaken in computer science and data science has been dedicated to a broad range of topics related to managing and controlling access to data. Some exemplary diverse areas that have attracted considerable research include: efficient data processing methods, data compression technologies, data searching methodologies, data security techniques and data storage technologies. These a just a few of the areas that have attracted considerable commercial research.

In many scenarios it is important that the management of data involve, at some level within a computer system, the ability to strictly controlled access to data for authorised purposes and processes only. For example, in computer systems designed to manage sensitive data (such as financial transactions) it is paramount that access to sensitive data is strictly controlled for many of reasons including, for instance, the ability to prevent changes to data for the purposes of fraud or the ability to preserve the privacy of those parties involved in financial transactions. When it comes to technologies for controlling access to data much of the focus is on determining whether the process or user has the necessary privileges to access that data. This might be a simple case of the computer system determining whether a user or process is the owner of that data. More specifically, this might involve confirming that the entered username and password for an online bank account are correct and if so access to the relevant financial data or other sensitive information is granted. While in some situations the simple check of username and password for granting access to sensitive data may be sufficient there are various scenarios where a more comprehensive authorisation check needs to be completed before access to data is provided.

SUMMARY

In a particular embodiment there is a method for managing data in a computer system comprising a processor and a data storage device, the method comprising the steps of:
the processor effecting storage of first subsidiary data in the data storage device, the first subsidiary data representing information related to a customer account;
the processor effecting storing of second subsidiary data in the data storage device, the second subsidiary data representing at least a portion of the information related to the customer account;
the processor effecting a determination of a geographic location of a computing device that is remote to the computer system; and
in response to the processor determining that the geographic location of the computing device meets a predefined criterion, the processor effecting a change to the first subsidiary data and a related change to the second subsidiary data.

An advantage provided by this embodiment is that the method offers an additional level of access control to managing the data stored in the data storage device. By incorporating the ability to determine the geographic location of the computing device the computer system is able to control changes and access to the data, which will only occur if the geographic location of the computing device meets a predefined criterion. In this particular embodiment the criterion includes whether the computing device is physically located within a certain location and this can include, for example, whether the computing device resides within a certain state of a country.

In the particular embodiment of the method it comprises the further step of the processor effecting storage of main data in the data storage device, wherein the first subsidiary data and the second subsidiary data each comprise at least a portion of the main data.

An advantage of creating the main data is that it can be used as a master copy of data and be used to manage changes that are made to the subsidiary data. The main data can also be used to populate new subsidiary data whenever it needs to be created, which is described in the following sections of this specification.

In the particular embodiment of the method it further comprising the steps of:
  the processor effecting a determination of another geographic location of the computing device;
  in response to the processor determining that the other geographic location of the computing device meets another
predefined criterion, the processor effecting a change to the first subsidiary data in response to an action being carried out by the computing device; and
  the processor effecting a change to the main data, wherein the change to the main data corresponds to the change to the first subsidiary data.

An advantage of this is that the ability of the remote computing device to change or alter data is controlled by the geographic location of the device. The remote computing device is only capable of initiating changes to data if the computing device is in a particular geographic region.

In the particular embodiment of the method it further comprises the steps of:
  in response to the processor determining that the geographic location of the computing device meets the predefined criterion, the processor effecting a change to the second subsidiary data in response to an action being carried out by the computing device; and
  the processor effecting a change to the main data, wherein the change to the main data corresponds to the change to the second subsidiary data.

An advantage of these steps is that different geographic locations of the remote computing device will determine which of the subsidiary data can be accessed and changed. This means that the ability of a computing device to access and change data is based on the location of that device.

In the particular embodiment of the method the step of the processor making the determination of the geographic location comprises the steps of:
  the processor processing certain data received from the computing device;
  the processor effecting a transfer of the certain data to a data processing system that is remote to the computer system, the data processing system being arranged to process the certain data and generate location related data; and
  the processor processing the location related data generated by the data processing system and subsequently processing the location related data to determine whether the geographic location of the computing device meets the predefined criterion.

In the particular embodiment of the method the step of the processor making a determination of the other geographic location comprises the steps of:
  the processor processing certain data received from the computing device;
  the processor initiating a transfer of the certain data to a data processing system that is remote to the computer system, the data processing system being arranged to process the certain data and generate location related data; and
  the processor processing the location related data generated by the data processing system and subsequently processing the location related data to determine whether the other geographic location of the computing device meets the predefined criterion.

While controlling access to data based on the geographic location of the remote computing device it is possible that the operator of the computing device could seek to gain fraudulent access to data by using a technique to falsify the geographic location of the computing device. However, the use of the services of the remote data processing system assists to facilitate the detection of a falsified geographic location of the computing device. As an example, if the remote computing device was a smart phone the data processing system to interface with a cellular mobile network to confirm the location of the computing device.

In the particular embodiment of the method the step of the processor effecting the change to the main data is performed at a predetermined period of time after the step of the processor effecting the change to the first subsidiary data is completed.

In the particular embodiment of the method the step of the processor effecting the change to the main data is performed at a predetermined period of time after the step of the processor effecting the change to the second subsidiary data is completed.

In another embodiment there is a computer system for managing data, the computer system comprising:
  a processor; and
  a data storage device, wherein the processor is arranged to perform the following steps:
    effect storage of first subsidiary data in the data storage device, the first subsidiary data represents information related to a customer account;
    effect storage of second subsidiary data in the data storage device, the second subsidiary data represents at least a portion of the information related to the customer account;
    effect a determination of a geographic location of a computing device that is remote to the computer system; and
    in response to the processor determining that the geographic location of the computing device meets a predefined criterion, the processor effects a change to the first subsidiary data and effects a related change to the second subsidiary data.

In the embodiment of the computer system the processor is arranged to effect storage of main data in the data storage device, wherein the first subsidiary data and the second subsidiary data each comprise at least a portion of the main data.

In the embodiment of the computer system the processor is arranged to perform the following steps:
  effect a determination of another geographic location of the computing device;
  in response to the processor determining that the other geographic location of the computing device meets another predefined criterion, the professor effects a change to the first subsidiary data in response to an action being carried out by the computing device; and
  effect a change to the main data, wherein the change to the main data corresponds to the change to the first subsidiary data.

In the embodiment of the computer system the processor is arranged to perform the following steps:
  in response to the processor determining that the geographic location of the computing device meets the predefined criterion, the processor effects a change to the second subsidiary data in response to an action being carried out by the computing device; and
    effect a change to the main data, wherein the change to the main data corresponds to the change to the second subsidiary data.

In the embodiment of the computer system the step of the processor effecting a determination of the geographic location comprises the steps of the processor:

processing certain data received from the computing device;

effecting a transfer of the certain data to a data processing system that is remote to the computer system, the data processing system being arranged to process the certain data and generate location related data; and processing the location related data generated by the data processing system and the processor subsequently processing the location related data to determine whether the geographic location of the computing device meets the predefined criterion.

In the embodiment of the computer system the step of the processor making a determination of the other geographic location comprises the steps of the processor:

processing certain data received from the computing device;

effecting a transfer of the certain data to a data processing system that is remote to the computer system, the data processing system being arranged to process the certain data and generate location related data; and processing the location related data generated by the data processing system and the processor subsequently processing the location related data to determine whether the other geographic location of the computing device meets the predefined criterion.

In the embodiment of the computer system the step of the processor effecting the change to the main data is performed by the processor at a predetermined period of time after the step of the processor effecting the change to the first subsidiary data is completed.

In the embodiment of the computer system the step of the processor effecting the change to the main data is performed by the processor at a predetermined period of time after the step of the processor effecting the change to the second subsidiary data is completed.

BRIEF DESCRIPTION OF DRAWINGS

Exemplary embodiments of the invention will now be described with reference to the accompanying drawings in which:

FIG. 5 shows further data that is used in the system of FIG. 1;

FIG. 7 provides details of certain information contained in the system shown in FIG. 1;

DETAILED DESCRIPTION

Figure 1:
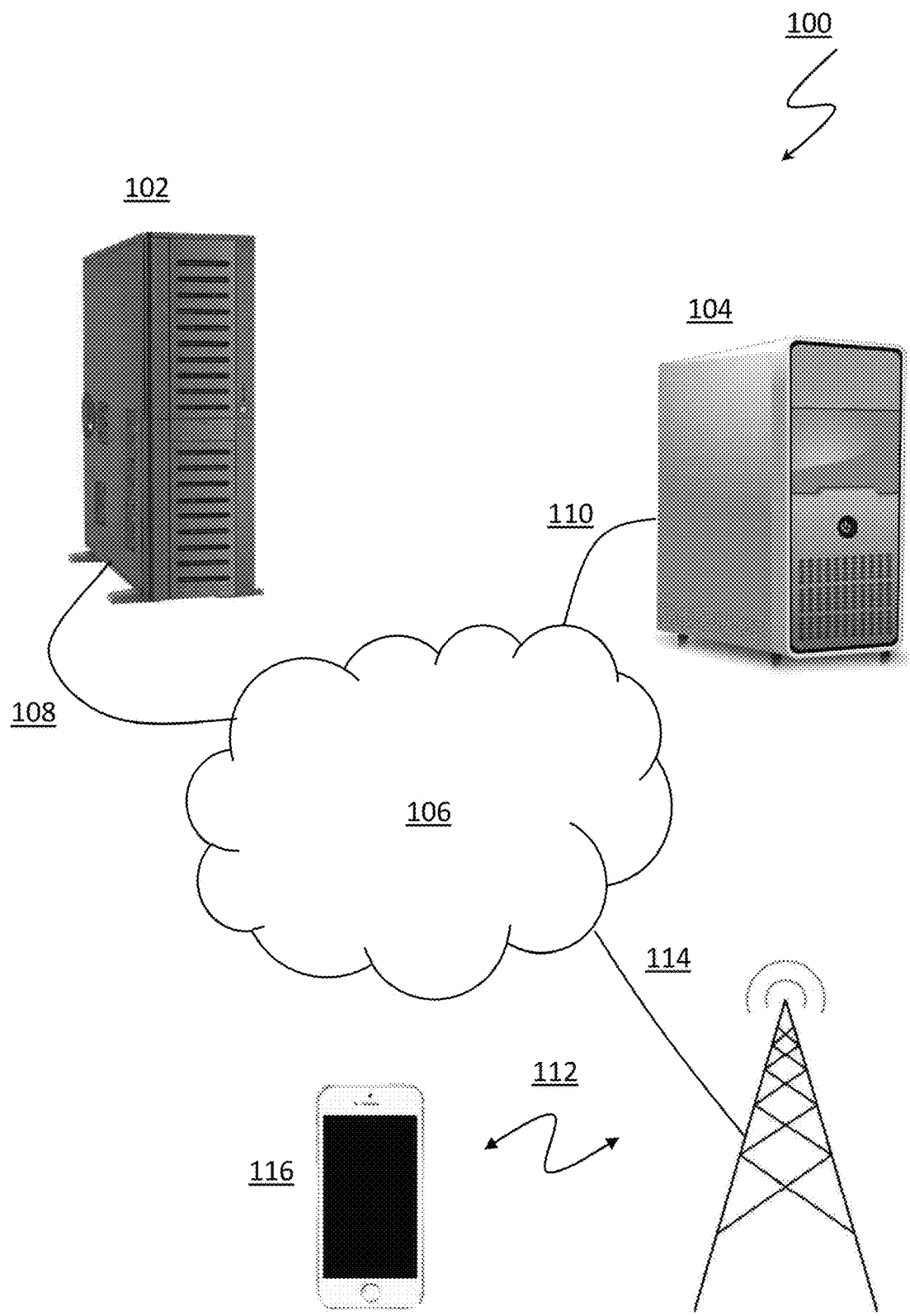
FIG. 1 is a schematic diagram of a particular embodiment of a computer system.
Figure 3:
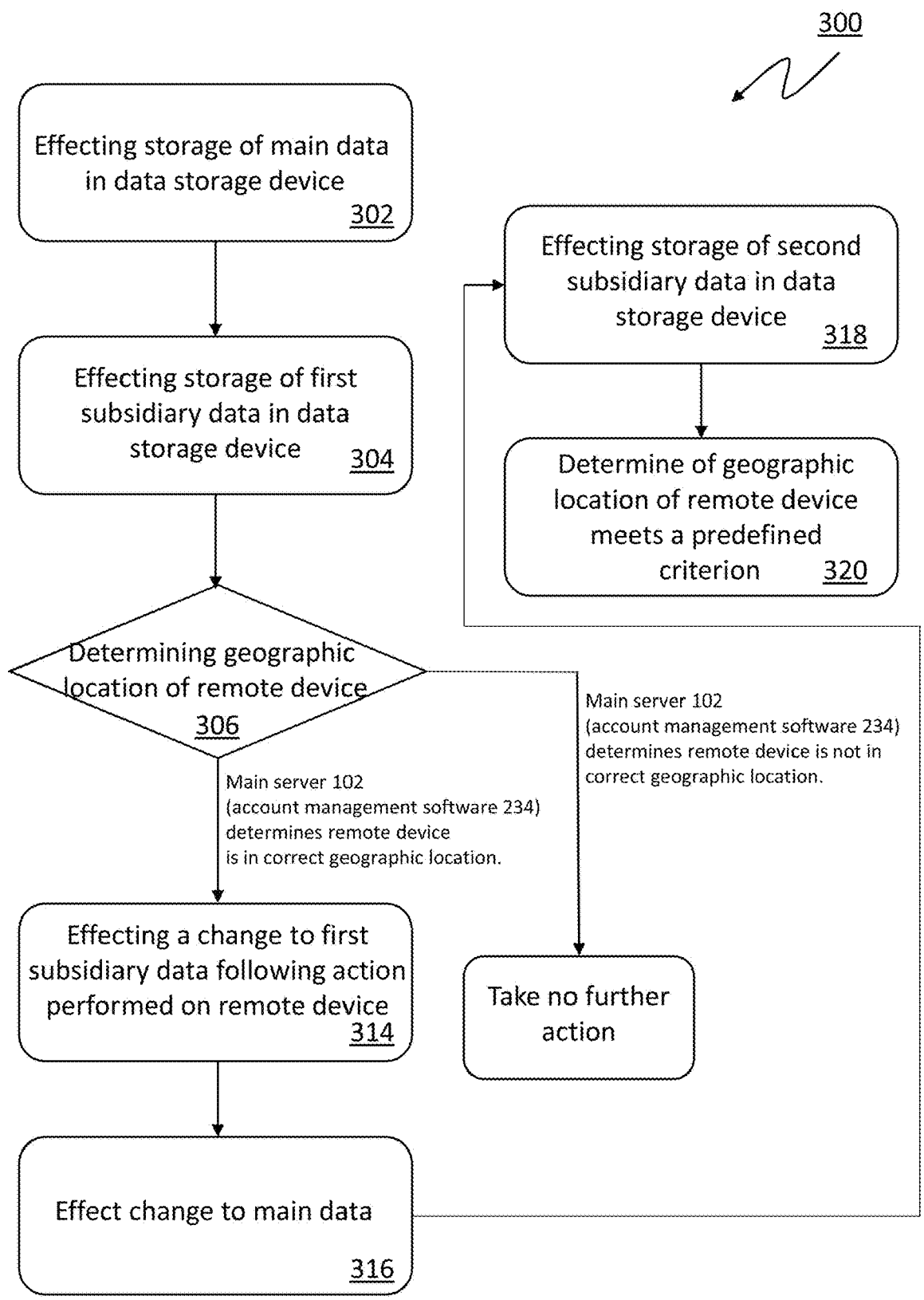
FIG. 3 illustrates an embodiment of a data management and access methodology performed in the system of FIG. 1.

FIG. 1 provides a high level schematic diagram of an embodiment of a computer system 100 that implements a geographic location based method for managing and controlling access to data. A flow chart of the location based method 300 is shown in FIG. 3. The field of data management and access control has a broad range of applications and accordingly it is envisaged that the computer system 100 and method 300 described throughout this specification can be applied to many different applications within computer systems where a geographic location is required to control and manage access to data. However, for the purpose of providing some context and aid in understanding possible applications this description is provided in the context of being applied to the field of online gambling, which can include (but is not limited to) sports betting, real money slot machines, horse racing and card games such as poker and blackjack. It is noted that while being described as being applied to online gambling the computer system 100 and methodology 300 described with reference to FIGS. 1 and 3 is not limited to the application to only online gambling and can have applications in areas such as online banking, online shopping and remote file access. In the field of online banking the system 100 and method 300 described herein could be used to control access to financial data based on the country in which a user is seeking access to the data. In the case of online shopping the system 100 and method 300 described herein could be used to access the relevant goods and services data for the region in which a remote user is located. In the case of remote file access the system 100 and method 300 described herein could be used to restrict access to file data only if the user is located in a certain geographic location.

The following is a detailed description of the application of the system 100 and method 300 of FIGS. 1 and 3 to the field of online gambling. Referring to FIG. 1, a system 100 suitable for supporting online gambling comprises a main server computer 102 and a location confirmation server 104. The main server 102 and the location confirmation server 104 are in the form of enterprise grade computer servers such as those available for Dell Inc. While this description makes reference to single servers 102 and 104 it is envisaged that these servers 102 and 104 may well be a group of multiple servers to provide redundancy, load sharing capabilities and distributed computing.

The system 100 also comprises a computer network 106 (which in this embodiment is the public packet switched TCP/IP Internet). The main server computer 102 and the location confirmation server 104 are both connected to the computer network 106 via high capacity data links 108 and 110. In this embodiment the high capacity links 108 and 110 are in the form of dedicated fibre optical data links.

The system 100 also includes a wireless telecommunications network 112 that is also connected to the computer network 106 via a high capacity data link 114. The system 100 also comprises a user smartphone 116 that is wirelessly connected to the telecommunications network 112. In this embodiment the wireless telecommunications network 112 is in the form of a cellular mobile telephone network such as that offered by AT&T. It is noted that this description of the computer system 100 makes reference to only a single user smartphone 116 for the sake of providing a simple description, but it will be appreciated that the system 100 would comprise thousands of user smartphones.

Figure 2:
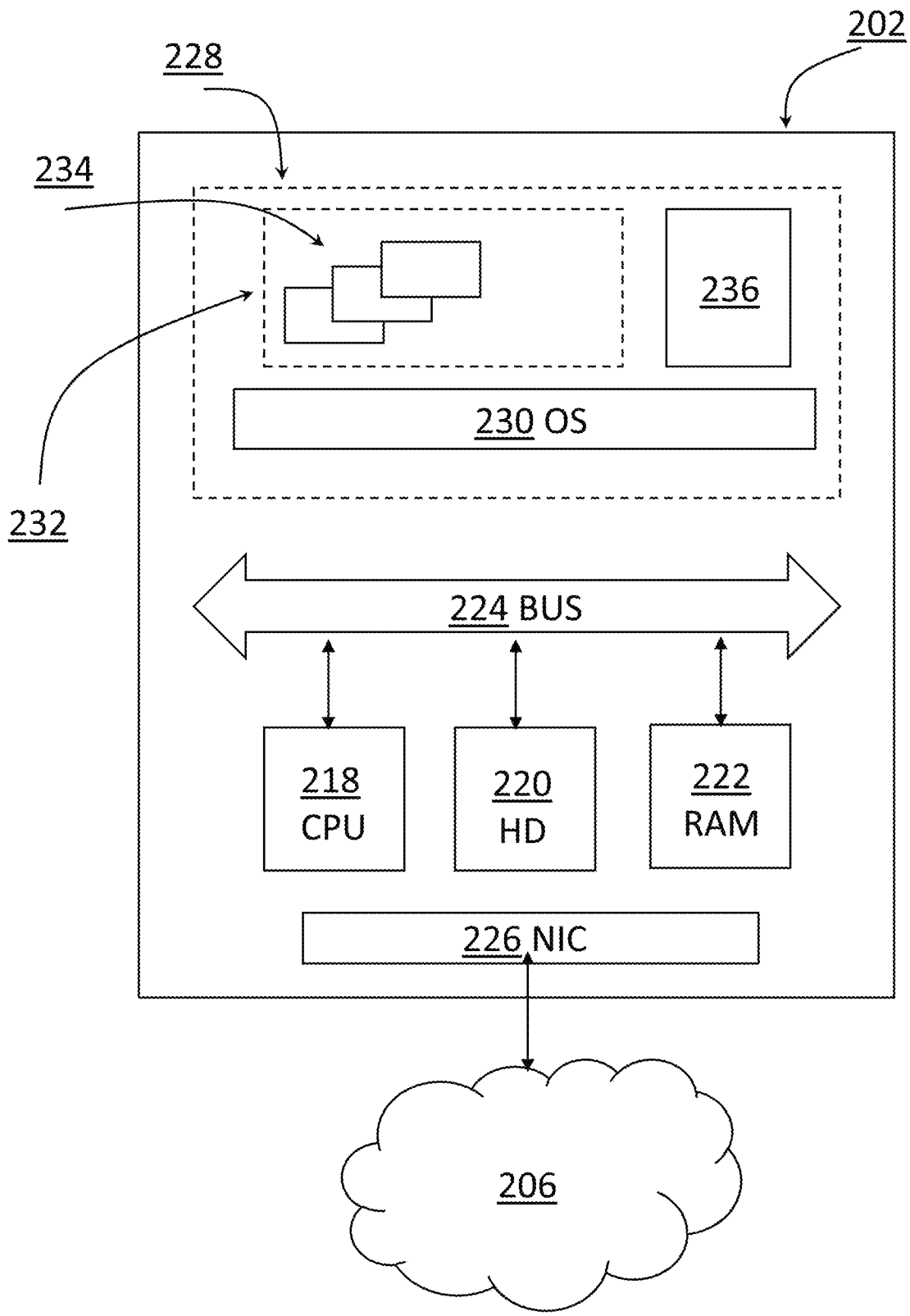
FIG. 2 provides a diagram of the main elements of a computer server deployed in the computer system of FIG. 1.

As described previously, this specification is directed to computer related technology that can be deployed where access to data contained in a hard disk requires a level of control over access to that data by elements or computational processes within the system 100. The following description is an exemplary application of the technology to the field of online gambling. In this particular embodiment the main server 102 of the system 100 is central to this exemplary application. Referring to FIG. 2 the main server 202 comprises several key hardware elements including: a processor 218; a hard disk 220 and random access memory 222. These hardware elements 218 to 222 are in data communication via a data bus 224. The main server 202 also includes a network interface card 226 that is also electrically coupled to the data bus 224 to thereby allow the main server 202 to exchange data via the computer network 206. The hard disk 220 contains various pieces of discrete software 228 including an operating system 230 (which in this embodiment is the Windows enterprise operating system) and various pieces of application software 232. One of the pieces of application
software 232 is customer account management software 234 for managing online gambling activity. As described in more detail in the following paragraphs of this description, the account management software 234 creates, accesses and manages certain data in the hard disk 220. However, the account management software's 234 ability to create and access data in the hard disk 220 is controlled via the data access library 236.

Figure 4:
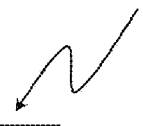
FIG. 4 shows certain data that is used in the system of FIG. 1.

Referring now to FIG. 3, the various steps 300 performed within the system 100 are now described. The first step 302 that is performed is when a user of the smartphone 116 wishes to establish an account to participate in online gambling. The owner and operator of the main server 102 provides a specific application designed to operate on the smartphone 116. Typically, the smartphone 116 application is made available by a common download site such as Apple's App Store. When installed on the smartphone 116 and running the applications prompts the user as to whether they wish to create an account. Assuming the user of the smartphone 116 elects to create an account then the application will send the appropriate data to the main server 102 via the network 106. The data indicates to the main server 106 that the user of the smartphone 116 wishes
to create an account. Using this data the main server 102 performs the first step 302. More specifically the account management software 234, which is being executed by the processor 218, creates main data 400 (see FIG. 4) and stores that data 400 in the hard disk 220. The main data 400 by and large represents information that is related to the user of the smartphone 116. Some of the specific information represented by the main data 400 includes, for example, the user's name, address, date of birth, bank account details and financial information. As mentioned previously the ability of the account management software 234 to create and store information on the hard disk 220 is controlled by the data access library 236. However, for
the purposes of creating and storing the main data 400 on the hard disk 220 the data access library 236 does not place any restrictions on the account management software 234.

Once the account management software 234, via the processor 218, has completed the step 302 of creating the main data 400, the account management software 234 and processor 218 proceed to perform the next step 304. The next step 304 involves the account management software 234 and processor 218 creating first subsidiary data 500 (see FIG. 5). At this point the first subsidiary data 500 initially represents the same user related information as the main data 400 (e.g., user's name, address, date of birth, bank account details and financial information). The account management software 234 and the processor 218 store the first subsidiary data 500 in the hard disk 220. When the account management software 234 and processor 218 initially creates and stores the first subsidiary data 500
in the hard disk 220 the data access library 236 does not place any restrictions on the ability of the user account management software 234 and the processor 218 to store the first subsidiary data 500 in the hard disk 220. However, as described in subsequent paragraphs of this description
the data access library 236 will place controls/restrictions around the ability of the management software 234 and the processor 218 ability to alter the subsidiary data 500.

Once the account management software 234 and the processor 218 have created and stored the main data 400 and the first subsidiary data 500 as previous described, the system 100 is now in a position to facilitate allowing a user of the smartphone 116 to place wagers on events. For the sake of an example the event in this description is the outcome of a sporting event such as Team A defeating Team B. The application previously described as being loaded on the smartphone 116 is such that it allows the user to place a range of different wager types on a range of different sporting outcomes. Once the user of the smart phone 116 has selected the wager type and the sporting
event they want wish to wager on, the application on the smartphone 116 sends the relevant wager data to the main server 102 initially via the telecommunications network 112 which in turn sends it via computer network 106.

Figure 6:
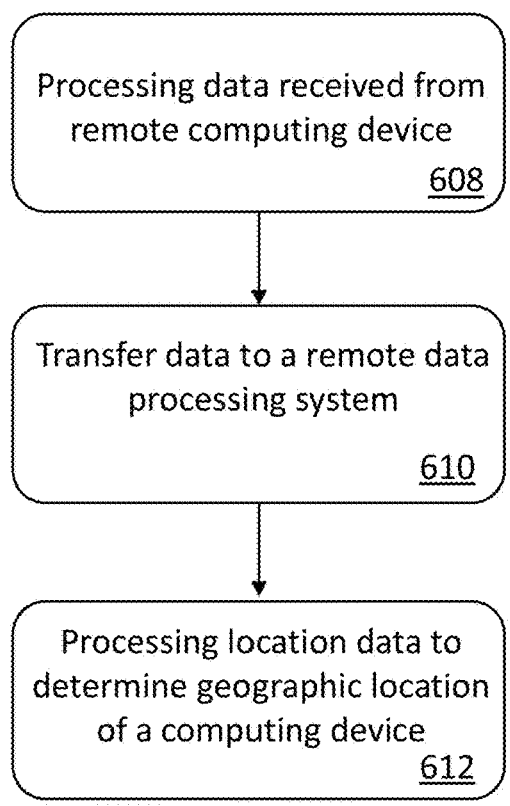
FIG. 6 provides details of various steps that make up part of the methodology shown in FIG. 3.

The next step 306 that is performed by the main server computer 102 involves the account management software 234 and the processor 218 making a determination as to the current geographic location of the smartphone 116. To make this determination the account management software 234 and the processor 218 performs several specific tasks. Referring to FIG. 6, the specific tasks involved in the step 606 of determining the geographic location of the smartphone 116 involves the initial step 608 of the account management software 234 and the processor 218 processing the wager data received from the smartphone 116 via the networks 106 and 112. By processing the wager data the account management software 234 and the processor 218 extract from the wager data certain information that relates to the smartphone 116. In this particular embodiment of the system 100 the information that relates to the smartphone 116 is the phone's 116 unique ID in the form of its electronic serial number (ESN).

Once the account management software 234 has obtained the smartphone's 116 unique ID the software 234 and the processor 218 proceed to perform the next step 610. This step 610 involves putting the unique ID of the smartphone 116 into a data packet and then transferring that data to the location confirmation server 104 via the computer network 106. The location confirmation server 104 has access to the telecommunications network 112 and as such can make electronic requests to the network 112 to confirm
the actual geographic location of the smartphone 116. More specifically, on receiving data containing the unique ID of the smartphone 116 (as described) the location confirmation server 114 processes that data to extract the
unique ID of the smartphone 116. Then using the unique ID the telecommunications network 114 "looks up" its internal records to determine the current geographic location of the smartphone 116. As a standard function of networks such as the telecommunications network 112 is that they
know the location of all smartphones 116. The telecommunications network 114 then advises the location confirmation server 104 of the current geographic location of the smartphone 116. The location confirmation server
104 embeds the geographic location of the smart phone 116 into a data packet and then transfers that data to the main server 102 via the computer network 106.

On receiving the data from the location confirmation server 104 the account management software 234 and the processor 218 are able to perform the next step 612. This step 612 involves the account management software 234 and the processor 218 processing the data received from the location confirmation server 104 to extract the geographic location information related to the smartphone 116. Once the geographic location has been extracted from the data the account management software 234 and the processor 218 can then determine whether the geographic location meets a predefined criterion and this is performed in conjunction with the data access library 236. More specifically, the predefined criterion is a predetermined geographic region, which in the case of this particular embodiment is the geographic region defined by certain state boundaries. For example, the geographic boundaries of the state of Nevada in the US. In light of this the account management software 234 and processor 218 would determine whether the geographic location of the smartphone 116 is within the geographic boundaries of the state of Nevada.

In the event that the account management software 234 and the processor 218 determine that the geographic location of the smartphone 116 is within the state boundaries of the state of Nevada, the management software 234 and processor 218 proceeds to perform the next step 314. In the event the geographic location does not meet the predefined criterion the data access library 236 will prevent the next step 314 from being performed. This next step 314 at a high level enables the smartphone 116 to make changes to the first subsidiary data 500, but this can only be done if as a result of the prior step 306 the account management software 234 and the processor 218 determining that the smartphone 116 is within the geographic boundaries of the state of Nevada. As mentioned this is also controlled by the data access library 236. In the event that the smartphone 116 is located outside of the state of Nevada then the next step 314 will not be performed and is restricted by the data access library 236.

This step 314 involves the account management software 234 and the processor 218 effecting a change to the first subsidiary data 500 and this is done in response to an action(s) being performed on the smartphone 116. To put this into context, assume that the action being performed in the smartphone 116 is the act of the user wishing to place a wager on the outcome of a particular sports event. The application running on the smartphone 116 will allow the user to select a sports event they wish to wager on and then select the outcome they wish to wager on along with the amount they wish to wager. In this example the user wishes to wager $100 on Team A beating Team B. To convey this wager information to the server 102 the application on the smartphone 116 transfers data to the server 102 via the telecommunications network 112 and the computer network 106.

On receiving this data the account management software 234 and the processor 218 process the data to extract details of the wager that the user of the smartphone 116 wishes to place. As mentioned previously, the first subsidiary data 500 represents information related to the user of the smartphone 116 and some of this information relates to financial transaction data, which in this case include a history of wagers placed by the user of the smartphone 116. The account management software 234 and the processor 218 make the necessary changes to the first subsidiary data 500 to record details of the wager. An example of the wager transaction history 700 is shown in FIG. 7.

The user of the smartphone 116 would not have been permitted to place the wager if they had been located outside of the state of Nevada because of the previously describe geographic control over the ability to alter the first subsidiary data 500 and the access restrictions performed by the data access library 236.

Once the change to the first subsidiary data 500 has been made, the account management software 234 and the processor 218 perform the next step 316. This involves the management software 234 and the processor 218 making a change to the main data 400. The change to the main data 400 involves making the same corresponding changes to the main data 400 that were made to the subsidiary data 500, which in this example means recording the wager details in the wager transaction history of the main data 400. In this particular embodiment the main data 400 is being utilised as "master data" that is used to update other subsidiary data as is described in the following sections of this description. In this particular embodiment of the system 100 the change to the main data 400 is made at a predetermined period of time after the change to the first subsidiary data 500 is made and in this case that period
of time is every four hours.

Figure 8:
FIG. 8 shows data that is used in the system of FIG. 1.

One of the key technological aspects of the system 100 is that it enables different data to be access depending on the geographical location of the smartphone 116. So while in the prior example of only allowing the first subsidiary data 500 to be accessed and changed when the smartphone
116 is located in the state of Nevada, the system 100 will allow the smartphone 116 to access and make changes to different data when it is located outside of Nevada. This provides the overall benefit of having geographically dependent data. To put this in context assume the smartphone 116 travels from Nevada to Florida the account management software 234 and the processor 218 would perform the step 318 of creating second subsidiary data 800, which is shown in FIG. 8 and storing that data 800 on the hard disk 220. Like the first subsidiary data 500, the second subsidiary data 800 contains certain information related to the user of the smartphone 116 and much of that information is the same as that represented by the first subsidiary data 500. The main difference between the first subsidiary data 500 and the second subsidiary data 800 is that the first data 500 can only be accessed and changed when the smartphone 116 is within the
state boundaries of Nevada and the second data 800 can only be accessed and changed when the smartphone 116 is within the state boundaries of Florida. The system 100 is such that it can contain many different pieces of subsidiary data with each being restricted to access and change depending on the geographic location of the smartphone 116. So the system 100 can support a unique piece of subsidiary data for each state of the US or individual countries.

When the smartphone 116 is located in the state of Florida the user of the smartphone 116 can make wagers in the same manner as previously described in relation to Nevada. However, instead of the account management software 234 and the processor 218 making changes to the first subsidiary data 500, changes are made to the second subsidiary data 800. As with the prior description in relation to Nevada, any changes to the second subsidiary data 800 are also made to the main data 500 to provide a form of synchronisation of different subsidiary data 500 and 800.

A technological aspect of the system 100 is that it provides a form of "portable" data. For example, as the smartphone 116 travels from Nevada to Florida information that is represented by the first subsidiary data 500 can be moved across to the second subsidiary data 800. To put this in context, assume the first subsidiary data 500 contains information about the total amount of funds available for wagering that the user of the smartphone 116 has. Those funds can be "moved" across each piece of subsidiary data 500 and 800 to allow those funds to follow the geographic location of the smartphone 116, which in turn allows those funds to be accessed across various states. To do this the account management software 234 and the processor 218 perform the step 320 which involves the account management software 234 and the processor 218 initially making a change to the first subsidiary data 500 and then subsequently making a corresponding change to the second subsidiary data 800. The initial change to the first subsidiary data 500 represents a change to the current funds available to the user of the smartphone 116 and that change represents the withdrawal of all monies available for wagering in that state. The change to the second subsidiary data 800 represents a change to the data corresponding to a deposit of funds available for wagering. The amount of the funds deposited is the same amount as that withdrawn.

The step 320 corresponds to funds being transferred from Nevada (represented by the first subsidiary data 500) to Florida (represented by the second subsidiary data 800). This step 320 is also only performed when the account management software 234 and the processor 218 has determined that the smartphone 116 has travelled from Nevada to Florida as previously described. Once the second subsidiary data 800 has been changed to reflect a deposit of funds the user of the smartphone 116 is free to use those funds to place wagers as previously described and the various access controls provided by the data access library 236 are in place with regard to Florida.

It is noted that as a consequence of performing the step 320 of changing the first and second subsidiary data 500 and 800 the account management software 234 and the processor 218 also record the relevant transaction in the main data 400. This change 400 to the main data would be a change to the data that would represent the transaction involving the withdrawal of funds from the first subsidiary data 500 and the deposit of those funds to the second subsidiary data 800.

It is envisaged that the previous step 320 is performed automatically by the account management software 234 and the processor 218 following the detection of the smartphone 116 entering a new geographical location and would involve the transfer of all available funds. However, the user of the smartphone 116 could influence how this is performed. For example, instead of being performed automatically the application on the smartphone 116 can (on detecting it has moved to a new geographic location) prompt the user to initiate a transfer and exactly how much of the wagering funds they wish to transfer from one state to another state. The application is capable of sending the necessary data to the server 102 via the network 106, which is used by the account management server 102 and processor 218 to perform step 320 as required.

Figure 9:
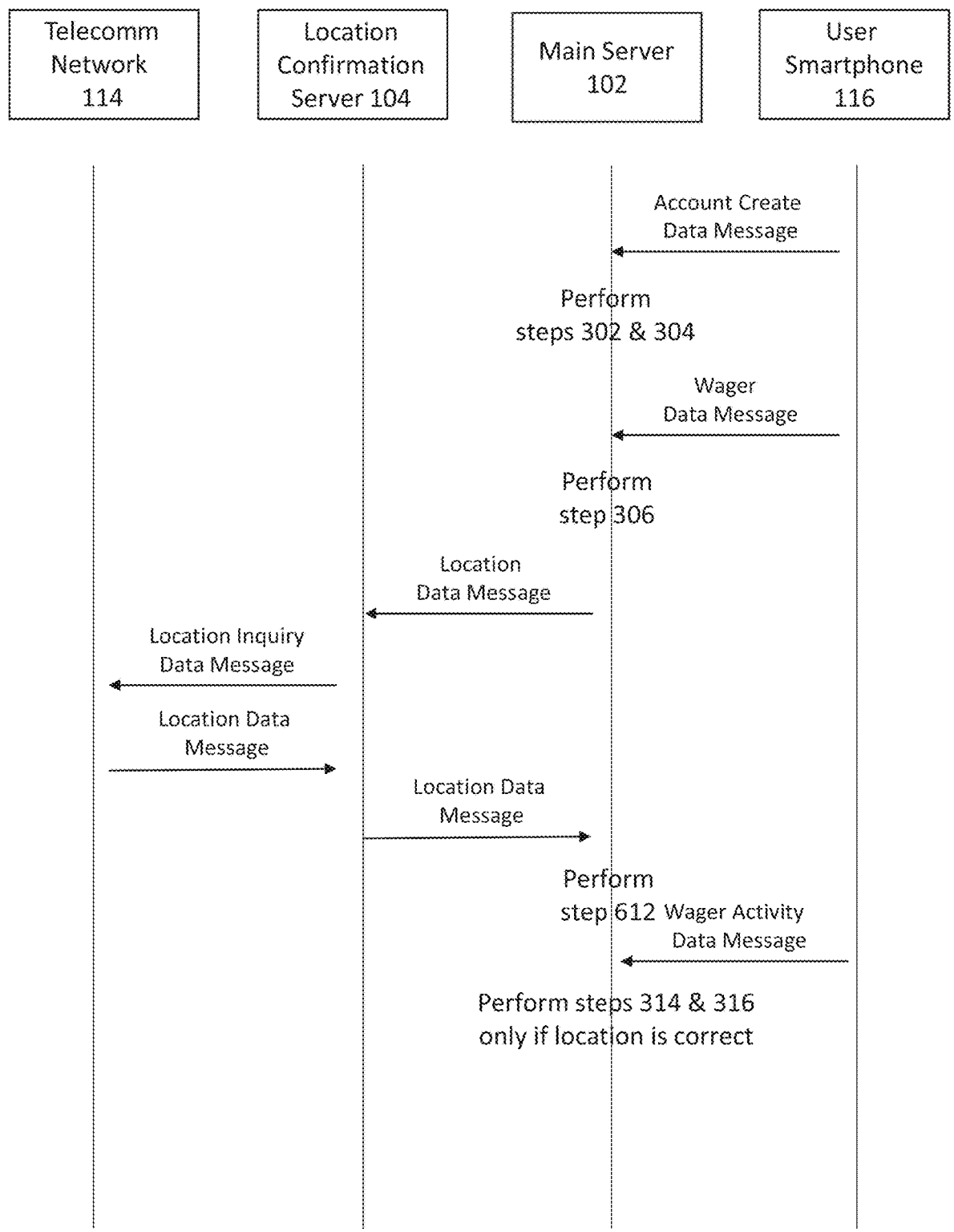
FIG. 9 shows the exchange of data messages between various elements shown in FIG. 1.

The flow of data messages exchanged in the computer system 100 are shown in FIG. 9.

It is noted that while the described embodiment in this specification is provided in the context of including the user smart phone 116 and wireless network 112, persons skilled in the art will readily appreciate that embodiments of the system 100 can include non-wireless devices such as a personal computer connected to a traditional wired internet link such as a fibre-optic cable. The system 100 is such that it can support both wireless devices such as smartphones and wired devices such as personal computers.

The description of the embodiment system 100 provided in this specification is also given in the context of using a single main server 102, which is responsible for carrying out all of the processing and management of the relevant data. It is noted, however, that the data processing and management functionality described herein can, in alternative, embodiments being carried out across multiple servers in which each server has some but not all of the functions and responsibilities described herein. For example, where multiple servers are used one of the servers main only be responsible for the managing and processing the main data, another separate server may be responsible for managing and processing the first subsidiary data and another separate server may be responsible for managing and processing the second subsidiary data. In this case all of the separate servers would cooperate in a coordinated manner to provide the described data processing and management functionality. Using the separate servers provides several benefits such as, for example, being able to move some of the data management functions to the "cloud", which for example could be done for the management and processing of the main data. Also, the separate servers for managing the subsidiary could be physically located in certain geographic locations where it is better to process and manage the subsidiary data.

The invention claimed is:

1. An apparatus comprising:
memory; and
at least one processor to execute instructions stored in the memory to at least:
determine a geographic location of a computing device associated with a user, the computing device remote from a data storage device, the data storage device including main data, first subsidiary data, and second subsidiary data associated with the user;
change from the main data to a selected one of the first subsidiary data or the second subsidiary data based on the geographic location; and
modify the selected one of the first subsidiary data or the second subsidiary data via the computing device.

2. The apparatus of claim 1, wherein the at least one processor is to facilitate transfer of the selected one of the first subsidiary data or the second subsidiary data from the data storage device to the computing device.

3. The apparatus of claim 1, wherein the at least one processor is to confirm the geographic location using a network.

4. The apparatus of claim 1, wherein the geographic location includes at least one of a country or a state.

5. The apparatus of claim 1, wherein the computing device includes a smartphone.

6. The apparatus of claim 1, wherein, when the geographic location is a first location, the computing device is allowed to interact with the first subsidiary data and restricted from the second subsidiary data, and, when the geographic location is a second location, the computing device is allowed to interact with the second subsidiary data and restricted from the first subsidiary data.

7. The apparatus of claim 1, wherein the at least one processor is to facilitate a change to the first subsidiary data via the computing device when the computing device is in a first location.

8. The apparatus of claim 7, wherein the change to the first subsidiary data includes a wager.

9. The apparatus of claim 8, wherein the wager is placed on an outcome of an event.

10. The apparatus of claim 9, wherein the event includes at least one of sports betting, a slot machine, horse racing, or a card-based game.

11. The apparatus of claim 1, wherein a change to the first subsidiary data or the second subsidiary data is reflected in an update to the main data after a time period.

12. The apparatus of claim 1, wherein the memory and the at least one processor are included in the computing device.

13. The apparatus of claim 1, wherein the memory and the at least one processor are included in the data storage device.

14. The apparatus of claim 1, wherein the memory and the at least one processor are included in a cloud-based server.

15. A non-transitory computer-readable medium comprising instructions to cause at least one processor to:
   determine a geographic location of a computing device associated with a user, the computing device remote from a data storage device, the data storage device including main data, first subsidiary data, and second subsidiary data associated with the user;
   change from the main data to a selected one of the first subsidiary data or the second subsidiary data based on the geographic location; and
   modify the selected one of the first subsidiary data or the second subsidiary data via the computing device.

16. The non-transitory computer-readable medium of claim 15, wherein the instructions, when executed, cause the at least one processor to facilitate transfer of the selected one of the first subsidiary data or the second subsidiary data from the data storage device to the computing device.

17. The non-transitory computer-readable medium of claim 15, wherein the instructions, when executed, cause the at least one processor to confirm the geographic location using a network.

18. The non-transitory computer-readable medium of claim 15, wherein, when the geographic location is a first location, the computing device is allowed to interact with the first subsidiary data and restricted from the second subsidiary data, and, when the geographic location is a second location, the computing device is allowed to interact with the second subsidiary data and restricted from the first subsidiary data.

19. The non-transitory computer-readable medium of claim 15, wherein the instructions, when executed, cause the at least one processor to facilitate a change to the first subsidiary data via the computing device when the computing device is in a first location.

20. A method comprising:
   determining, by executing an instruction using at least one processor, a geographic location of a computing device associated with a user, the computing device remote from a data storage device, the data storage device including main data, first subsidiary data, and second subsidiary data associated with the user;
   changing, by executing an instruction using the at least one processor, from the main data to a selected one of the first subsidiary data or the second subsidiary data based on the geographic location; and
   modifying, by executing an instruction using the at least one processor, the selected one of the first subsidiary data or the second subsidiary data via the computing device.

* * * * *